United States Patent [19]

Kleppner

[11] 4,293,769

[45] Oct. 6, 1981

[54] DETECTING IR AND MM RADIATION

[75] Inventor: Daniel Kleppner, Belmont, Mass.

[73] Assignee: Massachusetts Institute of Technology, Cambridge, Mass.

[21] Appl. No.: 94,959

[22] Filed: Nov. 16, 1979

Related U.S. Application Data

[63] Continuation of Ser. No. 869,345, Jan. 13, 1978, abandoned.

[51] Int. Cl.³ .............................................. G01J 1/00
[52] U.S. Cl. ................................. 250/338; 250/423 P
[58] Field of Search .................... 250/336, 338, 423 P; 55/2; 204/DIG. 11

[56] References Cited

U.S. PATENT DOCUMENTS

| | | | |
|---|---|---|---|
| 3,443,087 | 5/1969 | Robieux | 250/423 P |
| 3,478,204 | 11/1969 | Brubaker et al. | 250/423 P |
| 3,987,302 | 10/1976 | Hurst et al. | 250/423 P |
| 4,020,350 | 4/1977 | Ducas | 250/423 P |

OTHER PUBLICATIONS

"Stark Ionization of High-Lying States of Sodium", Ducas et al., Phy. Rev. Lett., vol. 35, No. 6, Aug. '75, pp. 366-369.

*Primary Examiner*—Bruce C. Anderson
*Attorney, Agent, or Firm*—Arthur A. Smith, Jr.; Charles Hieken

[57] ABSTRACT

An atomic beam is excited by laser radiation to a state with large principal quantum number. The beam is irradiated with infrared or millimeter wave radiation which is to be detected. The atoms absorb the radiation by making transitions to higher-lying states. The transitions are sensed by applying an electric field which ionizes atoms in the final state, but not the initial state. The ions are collected and detected by conventional pulse-counting or direct current methods.

5 Claims, 1 Drawing Figure

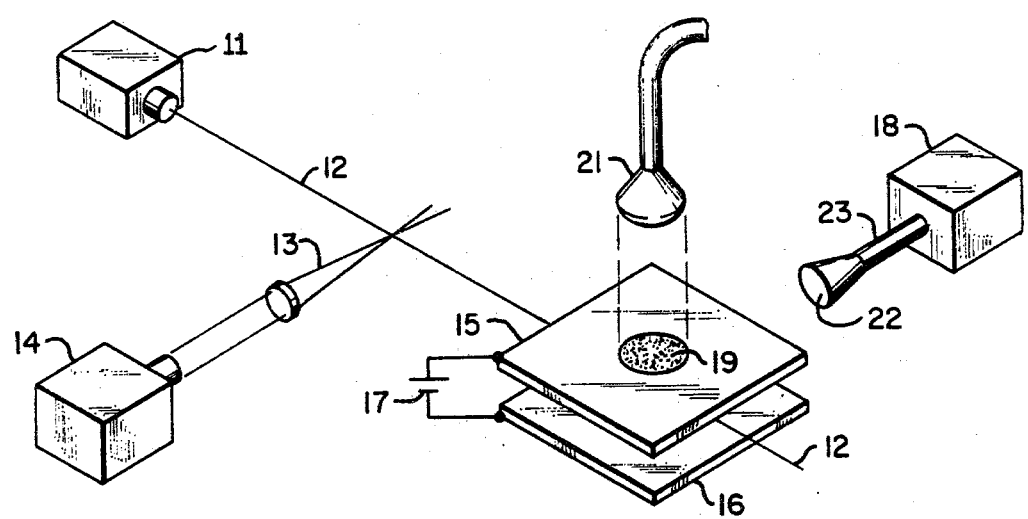

4,293,769

DETECTING IR AND MM RADIATION

The Government has rights in this invention pursuant to Contract No. F44620-72-C-0057 awarded by the Department of the Air Force and Contract No. DAAB07-74-C-0630 awarded by the Department of the Army.

This is a continuation of application Ser. No. 869,345, filed Jan. 13, 1978, now abandoned.

BACKGROUND OF THE INVENTION

The present invention relates in general to electromagnetic radiation detection and more particularly concerns novel apparatus and techniques for the detection of infrared (IR) and millimeter (mm) radiation through resonance absorption by highly excited atoms in the presence of an electric field, carrying the atom from a state which is stable against static ionization into one which is rapidly ionized. The invention is capable of sensing either narrowband or broadband signals in a large angular aperture with high quantum efficiency and low noise.

It is an important object of the invention to provide methods and means for IR and mm radiation detection.

It is another object of the invention to achieve one or more of the preceding objects while sensing either narrowband or broadband electromagnetic signals in a large angular aperture.

It is a further object of the invention to achieve one or more of the preceding objects while detecting infrared, microwave and/or optical radiation at various energy levels.

It is a further object of the invention to achieve the preceding object while facilitating distinguishing the state of excited atoms.

SUMMARY OF THE INVENTION

According to the invention, means are provided for exciting atoms. Means are provided for establishing an electric field where the atoms receive the incident radiation. Detecting means are provided for detecting a characteristic of the excited atoms in the electric field, such as the ion or electron current produced in response to incident radiation that changes the state of excited particles producing atoms in selected excited states. Means are provided for allowing the atoms to absorb applied optical, infrared or millimeter wave radiation. Means are provided for establishing an electric field to ionize atoms which have absorbed radiation, and for detecting the ions and/or electrons.

BRIEF DESCRIPTION OF THE DRAWING

Numerous other features, objects and advantages of the invention will become apparent from the following specification when read in connection with the accompanying drawing the single FIGURE of which: is a pictorial representation of a system according to the invention.

DETAILED DESCRIPTION OF PREFERRED EMBODIMENTS

With reference now to the drawing, there is shown a pictorial representation of a system according to the invention in which an oven containing alkali metal 11 produces an atomic beam 12 that is excited by laser beam or beams 13 from laser source 14 to produce an excited atomic beam that enters the electric field between plates 15 and 16 to produce an ion current that exits through aperture 19 upon ion detector 21. Antenna 22 illuminates the region between plates 15 and 16 with radiation coupled by waveguide 23 from source 18 so that the ion current sensed by ion detector 21 is related to the radiation produced from source 18, typically in the millimeter and infrared range. A DC voltage source 17 applies a potential between plates 15 and 16 to establish the electric field therebetween.

The electric field causes the separation between the energy level to which the particles in the beam are excited and a higher energy level to correspond to the frequency of the radiation from source 18. It is convenient to periodically pulse the potential applied between plates 15 and 16 to a value high enough to ionize the incident excited atoms in the beam, which are excited to a higher level.

The invention uses atoms or molecules which are excited by stepwise absorption of two photons, or by a single one- or two-photon process. For example, atoms in ground state 1 may be excited to level 2 by radiation of appropriate wavelength from laser source 14, and radiation from a different laser source (not shown) may excite the atoms in level 2 to level 3. For sodium atoms these wavelengths are typically 5890 Å and 4100–4300 Å, respectively. Radiation from antenna 22 may then excite the atoms in level 3 to level 4, this energy difference being small and corresponding to a wavelength, typically infrared of wavelength 10,000 Å to 1 mm. The energy level difference between level 3 and 4 may be shifted by controlling the potential between plates 15 and 16 so that it corresponds to the frequency of the infrared energy provided by antenna 22 to be detected. Typically voltage pulses may be applied between plates 15 and 16 of different amplitudes to excite atoms to the fourth energy level and strip electrons from those atoms in the fourth energy level but not those that remain in the third energy level and thereby produce a proportional number of ions that are detected by ion detector 21 to produce a peak ion current at a pulse amplitude corresponding to the intensity of radiation from antenna 22.

Having discussed a particular embodiment of the invention, the principles of operation will now be described. For background reference is made to a paper entitled "Stark Ionization of High-Lying States of Sodium" in PHYSICAL REVIEW LETTERS, Vol. 35, No. 6 for Aug. 11, 1975, pp. 366–69.

For many purposes an atom with a single highly excited electron can be treated as if it were hydrogen. The energy for the level with principal quantum number n is $$W_n = -1/2n^2 \text{ (atomic units, a.u.)} \quad (1)$$

and the spacing between adjacent levels is $$\Delta W_n = -\tfrac{1}{2}\left(\frac{1}{n^2} - \frac{1}{(n+1)^2}\right) \cong \frac{1}{n^3} \, a.u. \quad (2)$$

$$= \frac{2.2 \times 10^5}{n^3} \text{ cm}^{-1}$$

where $n \gg 1$. As n varies between 10 and 40 the level spacing varies between 220 cm$^{-1}$ and 3.5 cm$^{-1}$. By considering absorption processes $n \rightarrow n' = n + m$, where m can be as large as 10, the energy range can be extended to 2200 cm$^{-1}$.

To detect a resonance absorption transition, the following principle is used: In the presence of an applied electric field E the atomic potential $V = -1/r + Ez$ (a.u.) has a maximum $V_{max} = -2\sqrt{E}$. An atom in state n will ionize if the peak of the barrier lies below the binding energy, $W_n$. If we neglect the Stark shift of state n, which introduces a small shift in $W_n$ due to distortion of the atom by the applied field, then the field at which ionization occurs is $$E_i(n) = \frac{1}{16n^4} \text{ (a.u.)} \quad (3)$$
$$= 2.6 \times 10^8/n^4 \text{ V/cm.}$$

For n=30, $E_i$=320 V/cm.

For narrowband operation it is essential to be able to vary the absorption frequency. This can be accomplished by shifting the energy levels with an applied electric field. In a field E, a level with principal quantum number n undergoes an energy shift $$\delta W_E = \frac{3}{2} nkE$$

where k has the value n−1, n−2 ... −(n−1). As the field is increased, the different sublevels undergo shifts large compared to the separation of adjacent levels, providing continuous frequency coverage.

Consider the transition n→n′=n+m, where m=1,2, .... If a static field $E_0$ is applied satisfying $$E_i(n') < E_0 < E_i(n)$$

then the transition immediately results in ionization. The ion, or the electron, can be detected by conventional means with high speed.

The fundamental source of noise in the proposed device, analogous to the dark current in a PMT, arises from the possibility that an atom will ionize spontaneously by tunneling in a field less than its critical field. In principle, this can always happen no matter how small the field. In practice, the spontaneous rate is so low that in many cases it can be neglected.

The cross section for dipole absorption of resonance radiation with wave length $\lambda$ is $$\sigma_o = \pi \lambdabar^2 \quad (4)$$

where $\lambdabar = \lambda/2\pi$. The resonance cross section is so large that very few absorbers are needed to detect resonance radiation. (Ideally, 1 atom per $\pi\lambdabar^2$ will do.) However, the natural linewidths for atomic transitions are intrinsically small, and for broadband detection large numbers of absorbers are required. Consider now the problem of calculating the required number of excited atoms to detect efficiently radiation in bandwidth B centered at frequency $\nu_s$, corresponding to an atomic transition n→n+1.

The effective cross section for excitation of an atom by radiation in bandwidth B is:

$$\sigma_{eff} = \sigma_o \Delta\nu_o/(B^2 + \Delta\nu_o^2)^{\frac{1}{2}} \approx \sigma_o \Delta\nu_o/B \quad (5)$$

where $\Delta\nu_o$ is the natural linewidth for the transition, and $\Delta\nu_o << B$. For high quantum efficiency we require that the detector be optically opaque:

$$\rho \sigma_{eff} l = 1 \quad (6)$$

where $\rho$ is the density of absorbers and l is the length of the detection region. The minimum area of the detector area is $A_d = \sigma_o$; in practice a larger area may be convenient. We introduce the parameter $$a = A_d/\sigma_o > 1. \quad (7)$$

The total number of absorbers required for 30% quantum efficiency is $$N_a = \rho V = \rho A_d l = \frac{B}{\Delta\nu_o} a \quad (8)$$

Consider now noise properties. The "Rydberg detector" is similar to an incoherent detector in that it is essentially a photon counting device. It has, however, certain features of a coherent detector; in particular, it is capable of narrow bandwidth operation. For communication purposes coherent detectors are generally desired, and for this reason it is convenient to characterize the noise in terms of noise equivalent power per bandwidth.

For an ideal single mode coherent detector the noise equivalent power is given by $$(NEP)_i = h\nu B \left( \frac{1}{\eta} + \frac{1}{e^{h\nu/kT}} \right). \quad (9)$$

where $\eta$ is the detector quantum efficiency. The second bracketed term represents thermal noise of the system. For the present assume that $kT << h\nu$ so that the thermal noise can be neglected. Reference is made to D. S. Bailey, R. J. Hiskes and A. C. Riviere, Nuclear Fusion 5, 41 (1965).

Noise in the Rydberg detector is due to all spurious sources which produce ions. If the total rate of spurious ion production is $I_n$ ions/sec, then the noise equivalent power is $$(NEP)_R = h\nu I_n. \quad (10)$$

We turn now to the evaluation of $I_n$.

The two most prominent processes which produce ionization are spontaneous ionization of the Rydberg atoms by tunneling in the applied field, noise analogous to dark current in a photomultiplier, and ionization due to collision between the Rydberg atoms. Each of these processes is considered in turn.

Resonance absorption is detected by ionization of the final state n′ at some rate $\Gamma_i(n')$ which is determined by the externally applied field. Ideally, the initial state, n, is not affected by the field; in reality it, too, will ionize, but at a rate $\Gamma_i(n) << \Gamma_i(n')$. If we introduce the parameter $$\beta = \Gamma_i(n)/\Gamma_i(n') << 1 \quad (11)$$

then the total rate at which spurious ionization occurs is $$I_{dc} = \Gamma_i(n) N_a = \beta \Gamma_i(n') N_a, \quad (12)$$

where the subscript dc indicates "dark current". The required rate $\Gamma_i(n')$ is fixed by bandwidth limitations. Ideally, the bandwidth of the detector is limited only by the ionization rate; the two quantities are related by $$\Gamma_i(n') = \pi B. \quad (13)$$

By combining Equns. (8, 12, 13), $$I_{dc} = \pi\alpha\beta \frac{B^2}{\Delta\nu_o}. \tag{14}$$

To estimate the noise contribution due to collisions between Rydberg atoms the collision cross section is determined. The theory of Rydberg-Rydberg collision has not been developed. For an order of magnitude estimate, assume that the collisional cross section is the geometrical cross section:

$$\sigma_c = \pi \langle r^2 \rangle = n^4 \pi a_o^2. \tag{15}$$

The collision rate is $$I_{col} + N_a^2 \sigma_c \bar{v}/2V \tag{16}$$

where $\bar{v}$ is the relative collision velocity, and V is the detector volume. Using $V = \alpha\sigma_o l$, and Eq. (8), $$I_{col} = \tfrac{1}{2}\alpha\left(\frac{B}{\Delta\nu_o}\right)^2 \frac{\sigma_c \bar{v}}{\sigma_o l}. \tag{17}$$

The total noise current is $I_n = I_{dc} + I_{col}$. From Eqns. (14) and (16)

$$I_n = \alpha \frac{B^2}{\Delta\nu_o}\left(\pi\beta + \frac{\sigma_c \bar{v}}{2\Delta\nu_o \sigma_o l}\right) \tag{18}$$

In order to make numerical estimates, it is desirable to express as many of the parameters as possible as universal functions of the principal quantum number.

The natural linewidth $\Delta\nu_o$ is most conveniently expressed in terms of the Einstein coefficient for the transition:

$$\Delta\nu_o = A_{n,n'}/\pi. \tag{19}$$

The Einstein coefficient is related to the oscillator, $f_{n,n'}$ strength by $$A_{n,n'} \cong 3.2 \times 10^{10} n^{-6} f_{n,n'} \text{ sec}^{-1}. \tag{20}$$

The following expression for hydrogen, due to Menzel, is valid for $m \ll n$:

$$f_{n,n+m} = n \frac{4}{3m^2} J_m(m) J_m'(m) \tag{21}$$

where $J_m$ is the Bessel function of order m. For m=1, f=0.19n, $$\Delta\nu_o = 1.9 \times 10^9 n^{-5} \text{ Hz}. \tag{22}$$

Thus, the leading factor in the right hand side of Eq. (18) is $$\alpha B^2/\Delta\nu_o = 5.2 \times 10^{-10} n^{-5} \alpha B^2. \tag{23}$$

The quantity $\beta$ can be estimated from the results for hydrogen calculated by reference to the aforesaid Bailey, Hiskes and Riviere publication. The ionization curves are sharply rising functions of the electric field; the ratio of rates for adjacent terms is essentially independent of n. A conservative estimate is $$\beta = 10^{-5}. \tag{24}$$

Using Eq. (14) for $\sigma_c$, and taking $\sigma_o = \pi\lambda^2 \cong (\tfrac{1}{4}\pi)(n^3/Ry)^2$, where Ry is the Rydberg constant, the second term in the bracket of Eq. (18) becomes $$\frac{\sigma_c \bar{v}}{2\Delta\nu_o \sigma_o l} = \frac{2\pi^2(a_o Ry)^2}{1.94 \times 10^9} \frac{\bar{v}}{l} n^3 = 3.43 \times 10^{-15} \frac{\bar{v}}{l} n^3. \tag{25}$$

For $\bar{v}$, take a typical beam velocity of $10^5$ cm/sec, and, for the detector absorption thickness, 0.1 cm.

By introducing Eqs. (23)–(25), in Eq. (18), $$I_n = 1.5 \times 10^{-14} \alpha B^2 n^5 \{1 + 1.1 \times 10^{-4} n^3\}. \tag{26}$$

This result may be interpreted in terms of a "quantum noise factor", $QF = (NEP)_R/(NEP)$. From Eqs. (10) and (11)

$$QF = \eta I_n/B. \tag{27}$$

Taking $\eta = e^{-1} = 0.37$, from Eq. (26), $$QF = 5.5 \times 10^{-15} \alpha B n^5 \{1 + 1.1 \times 10^{-4} n^3\}. \tag{28}$$

For comparison with other coherent detectors it is more useful to list the NEP per unit input bandwidth:

$$(NEP)_R/B = I_n h\nu/B. \tag{29}$$

Using the relation $h\nu = 4.36 \times 10^{-18}/n^3$ joules, from Eq. 26

$$(NEP)_R/B = 6.5 \times 10^{-32} \alpha B n^2 \{1 + 1.1 \times 10^{-4} n^3\} \text{ watts/Hz}. \tag{30}$$

Alternatively, it may be convenient to list the NEP in terms of the post-detection bandwidth $\Delta\nu_f = \tfrac{1}{2}\tau$, where $\tau$ is the integrating time. Using the relation $$\text{Noise Power} = \frac{h\nu I_n}{\sqrt{B\tau}} = \frac{h\nu I_n}{\sqrt{2B}} \Delta\nu_f^{\tfrac{1}{2}} \tag{31}$$

we have, Eq. (30), $$NEP = 4.6 \times 10^{-32} \alpha \sqrt{B} n^2 \{1 + 1 \times 10^{-4} n^2\} \text{ watts/Hz}^{\tfrac{1}{2}} \tag{32}$$

For numerical estimates take a 10 MHz bandwidth, and assume that the detector area is $10 \times \pi\lambda^2$ ($\alpha = 10$). The following results:

| Wavelength | n | NEP/B watts/Hz | NEP watts/Hz$^{\tfrac{1}{2}}$ |
|---|---|---|---|
| 1.2 mm | 30 | $2.3 \times 10^{-20}$ | $5.1 \times 10^{-17}$ |
| 496μ | 24 | $9.4 \times 10^{-21}$ | $2.1 \times 10^{-17}$ |
| 100 | 13 | $1.3 \times 10^{-21}$ | $2.9 \times 10^{-18}$ |

There has been described novel apparatus and techniques for detecting IR and mm electromagnetic radiation. It is evident that those skilled in the art may now make numerous departures from and modifications of the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. IR and mm energy detecting apparatus comprising,
    a source of a beam of atoms,
    means for establishing an electric field,
    means for causing said beam of atoms to enter said electric field,
    a source of essentially monochromatic energy for exciting atoms in said beam that enter said electric field into a predetermined energy level,
    means for illuminating said excited atoms in said electric field with IR or mm electromagnetic radiation and establishing the intensity of said electric field to step the energy level of said excited atoms in said electric field from said predetermined energy level to a higher level when the wavelength of said electromagnetic radiation is a predetermined value related to the contemporary intensity of said electric field to thereby produce particles stripped from those atoms at said higher level and emitted from said electric field representative of said radiation,
    and means for detecting the emitted particles to provide an indication of said radiation.

2. Energy detecting apparatus in accordance with claim 1 and further comprising means for establishing said electric field between conducting plates formed with an aperture through which the emitted particles may exit.

3. Energy detecting apparatus in accordance with claim 1 wherein said source of monochromatic radiation comprises a source of a laser beam.

4. Energy detection apparatus in accordance with claim 3 wherein said laser beam is incident upon said particle beam before the particles enter the electric field.

5. Energy detecting apparatus in accordance with claim 3 wherein said laser beam is incident upon said particle beam when the particles are in said electric field.

* * * * *